United States Patent Office 3,215,023
Patented Nov. 2, 1965

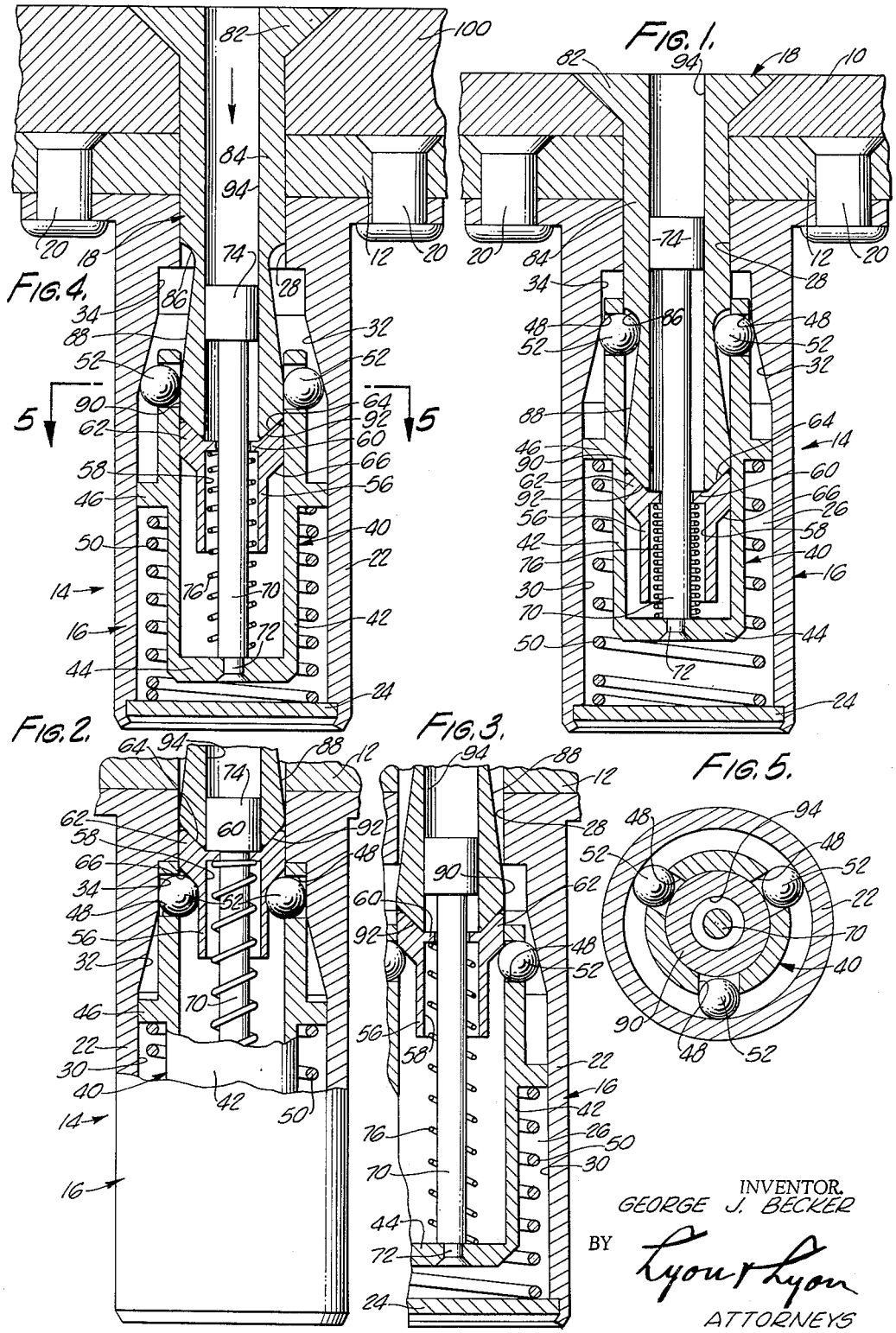

3,215,023
FASTENER
George J. Becker, Sepulveda, Calif., assignor to VSI Corporation, Culver City, Calif., a corporation of California
Filed Dec. 16, 1963, Ser. No. 330,890
8 Claims. (Cl. 85—5)

This invention relates to a fastening device and more particularly relates to a readily releasable fastening device for joining a plurality of sheets or panels.

A large number of fastening devices are presently available for temporarily connecting or joining a plurality of panels or sheets. These fastening devices are normally inserted into a series of aligned holes in the panels and are preferably provided with some mechanism allowing a quick release of the fastening. These devices generally take the form of a plug and socket construction in which the socket is located on one side of the panels and the plug, having some sort of retaining head, is inserted into the socket through the aligned holes, or the form of a barrel-like construction which is inserted into the aligned holes and which has a retaining head at one end and an extendable detent mechanism at the other end.

In order for these fastening devices to be completely effective, it is necessary that the total thickness of the panels be a constant predetermined value so that the retaining head and the socket or detent mechanism will firmly clamp the panels together. Since panel thicknesses, even of relatively highly machined panels or sheets, normally vary somewhat, a large number of different size fastening devices are commonly required, the fastening process being consequently slowed down while a fastening device of the proper size is found.

According to the present invention, a fastening device is provided which is suitable for tightly fastening together different combinations of panels, even when the total thickness of the different panel combinations vary. The invention utilizes a socket or receptacle positioned on one side of the panels and a plug that extends through the aligned holes in the panels. The receptacle has a ball lock mechanism which is capable of firmly holding the plug in place, even when the plug is inserted differing distances into the receptacle as is necessary with panel combinations of varying thickness.

It is therefore an object of the present invention to provide an improved fastening device for joining a plurality of panels or sheets.

It is also an object of the present invention to provide such a device for joining varying thickness panel combinations.

It is another object of the present invention to provide a straight line, quick inserting and quick releasing fastening device which requires no twisting, turning or leverage action.

It is a further object of the present invention to provide such a device having a locking mechanism which will lock a plug in a receptacle at varying depths of penetration therein.

It is a still further object of the present invention to provide a fastening device in which a receptacle is positioned on one side of a plurality of sheets or panels and a plug is passed through aligned holes in the sheets or panels, the receptacle having a ball lock mechanism for receiving the plug and locking it in a plurality of different positions in the receptacle.

These and further objects and advantages of the present invention will become more apparent upon reference to the accompanying description and drawings in which:

FIGURE 1 is a sectional elevation of the fastening device of the present invention showing the components thereof locking together sheets or panels of minimum thickness.

FIGURE 2 is a partial sectional view of the fastener of the present invention showing the position of the components thereof after the plug has just entered the receptacle;

FIGURE 3 is a partial sectional view of the fastener of the present invention showing the position of the components thereof after the plug has been partially inserted into the receptacle;

FIGURE 4 is a sectional elevation of the fastener of the present invention showing the components thereof locking together sheets or panels of maximum thickness; and FIGURE 5 is a sectional view taken along lines 5—5 of FIGURE 4.

Referring now to FIGURE 1, there is shown a pair of panels 10 and 12 joined together by the fastening device of the present invention, generally indicated at 14. The fastening device 14 includes a socket or receptacle 16 and a plug 18 for insertion therein. If desired, the receptacle 16 can be joined to the panel 12 by means of rivets 20.

The receptacle 16 is provided with an annular shell 22 and a bottom plate 24 defining a cavity 26. The upper end of the receptacle 16 is provided with an axial passageway 28 which communicates with the cavity 26. The interior wall surface of the shell 22 has a lower annular portion 30, an intermediate tapered portion 32, and a reduced upper portion 34.

Mounted within the cavity 26 is a cage 40 having an annular side wall 42, a bottom wall 44, an annular shoulder 46, and a plurality of radial passageways 48 in the upper portion thereof. A spring 50 is positioned on the base plate 24 of the receptacle 16 and seats against the shoulder 46, thus urging the cage 40 upwardly toward the top of the cavity 26. A plurality of balls 52 are positioned in the passageways 48, the balls having a diameter greater than the axial length of the passageways.

A spool 56 having an axial passageway 58 therethrough is positioned within the cage 40. The spool 56 is provided with an inwardly projecting annular flange 60 which reduces the diameter of the passageway 58. The upper portion 62 of the spool 56 is expanded, the expanded portion 62 having tapered upper and lower surfaces 64 and 66, the later surface acting as a camming surface, as will be explained presently.

A plunger 70 is positioned in the passageway 58 and is fastened at its lower end to the bottom wall 44 of the cage 40 by a rivet 72. The upper end of the plunger is provided with an expanded head 74. The diameter of the central portion of the plunger 70 is slightly less than the diameter of the reduced portion of the passageway 58 so that the spool 56 can move freely along the plunger 70 under the force of a spring 76 until the flange 60 of the spool 56 engages the head 74 of the plunger 70. The spring 76 is lighter than the spring 50.

The plug 18 is provided with a conically tapered upper portion 82, a cylindrical central portion 84, a rounded reduced portion 86, an outwardly tapering lower portion 88, a second cylindrical portion 90 equal in diameter to the portion 84, and an inwardly tapering portion 92. The angle of taper of the portion 92 is approximately equal to that of the surface 64 so that a good mating between these surfaces is formed. The tapered portion 88 of the plug 18 is provided with a smaller angle of taper than that of the tapered wall portion 32, for example, the tapered portion 88 may have an angle of taper of 9 degrees while the tapered wall portion 32 may have an angle of taper of 18 degrees.

The plug 18 is provided with a central passageway 94 extending axially the entire length of the plug 18. This passageway has a diameter slightly greater than the diameter of the head 74 on the plunger 70 so that the plug 18 may be inserted into the passageway 28 and telescope over the head 74 and plunger 70 until it engages the spool 56.

The operation of the fastening device of the present invention will now be described. Referring to FIGURE 2, the position of the various elements is shown as the plug 18 is just entering the axial passageway 28 in the receptacle 16, its lower surface 92 just engaging the upper surface 64 of the spool 56. At this time, the cage 40 and the spool 56 are both urged to their uppermost position by the springs 50 and 76. The balls 52 rest in the passageways 48 under the lower surface 66 of the spool 56 and are seated between the wall portion 34 of the receptacle 16 and the body of the spool 56.

Turning now to FIGURE 3, the position of the elements is shown after the plug 18 has been inserted into the cavity 26 of the receptacle 16. The plug 18 has pushed the spool 56 downwardly, causing the lower surface 66 thereof to force the balls 52 outwardly through the passageways 48. The downward force of the plug 18 is transmitted by the surface 66 and balls 52 to the cage 40, causing the cage 40 to move downwardly against the force of spring 50. The spool 56 is at the same time prevented from moving against the force of spring 76.

As the cage 40 moves downward, the action of the camming surface 66 on the balls 52 causes them to move outwardly in the passageways 48, an action that is permitted by the tapered nature of the wall portion 32. Finally, the balls 52 are pushed outwardly far enough to allow the surface 66, spool 56 and plug 18 to clear the balls. The spool 56 and plug 18 now move downwardly against the force of the spring 76 past the balls 52 which, of course, have concurrently been moving upwardly under the force of the spring 50. The downward force on the plug 18 is continued until the tapered head portion 82 is firmly seated in a tapered seat 96 formed in the panel 10. The downward force is then removed. The head and seat, of course, need not be tapered for proper operation.

The resulting position of the elements is shown in FIGURE 1. As soon as the balls 52 clear the surface 66 of the spool 56, there is no longer any force exerted against the cage 40. The spring 50 therefore forces the cage 40 and balls 52 upwardly until the balls 52 are firmly wedged between the tapered wall portion 32 and the tapered portion 88 of the plug 18.

When the force pressing downwardly on the plug 18 is removed, the spring 76 expands against the spool 56 to force the tapered portion 88 of the plug 18 upwardly. However, since the balls 52 have been pushed upwardly as far as the respective tapers of the wall section 32 and tapered portion 88 have permitted, the tapered portion 88 is firmly engaged with the balls 52 and cannot move upwardly. Since the tapers of these two portions are different, it can be seen no matter how far the plug 18 is pushed into the cavity 26 before the head 18 engages the seat 96 an instantaneous lock will be formed, so long, of course, as the plug 18 has been inserted far enough for the balls 52 to clear the surface 66.

The positions of the various components shown in FIGURE 1, are the positions they assume when the sheets or panels being fastened are of minimum thickness. In this case, the balls 52 have been wedged into locking position at the very top of the tapered surfaces 88 and 32. FIGURE 4 illustrates the position of the elements when thicker sheets have been fastened, the sheets shown being substantially the thickest that the illustrated fastening device can lock. As shown, a panel 100 has been laid over the panel 12 and the plug 18 inserted into the receptacle 16. In this case, the head 82 seats in the seat 102 just after the balls 52 have been forced outwardly enough to let the spool 56 and plug 18 clear them. The balls 52 were then immediately forced upward by the spring 50 and wedged between the two differently tapering surfaces 88 and 32, thus preventing upward movement of plug 18.

If the two surfaces 88 and 32 were not differently tapered, the plug 18 would be required to move upwardly to a single position where a lock would take place, thus limiting the total thickness of the sheets or panels able to be fastened to a single value. The differential taper of the surfaces 32 and 88 also permits the overall length of the device to be shortened. By increasing the difference between the angle of taper of the two surfaces, that is, by increasing the angle of taper of the wall portion 32, the longitudinal dimension of this wall portion can be decreased, thus decreasing the overall length of the receptacle.

To release the fastener, it is only necessary to exert a downward force on the head 74 of the plunger 70 by means of an elongated pin or nail. This force is transmitted through the plunger 70 to the base 44 of the cage 40, forcing the cage 40 downward against the force of the spring 50. As the cage 40 is moved downwardly, the balls 52 will also be moved downwardly, enabling the tapered portion 88 of the plug 18 to move upwardly.

When the cage 40 has been moved sufficiently downward, the balls 52 can move outwardly a sufficient amount to allow the tapered section 88 to clear them, resulting in the plug 18 being expelled from within the cage 40 because of the upward movement of the spool 56 under the force of the spring 76, the spool 56 moving up past the balls until the flange 60 engages the head 74 of plunger 70. The force exerted on the head 74 can now be released, permitting cage 40 to rise upwardly, the tapered surface 32 forcing the balls 52 back into the position shown in FIGURE 2.

From the foregoing description, it can be seen that a fastening device has been provided which is suitable for fastening together combinations of panels having varying total widths. This is accomplished by providing a receptacle with a ball lock mechanism which cooperates with a pair of differently tapered walls to lock a plug in the receptacle at any one of an infinite number of positions. The plug is inserted or released by a single straight line movement and thus is quickly and easily operated. By being suitable for use in joining a plurality of panels of different total thickness, the versatility of the fastener of the present invention is enhanced and the fastening process is speeded up. The number of different type fasteners necessary for a given application is accordingly also reduced.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:
1. A fastener comprising:
   a plug having a tapered lower portion;
   a housing having a central cavity therein, a portion of said cavity being tapered in the same direction as the tapered portion of said plug but at a greater angle, said housing having a passageway therein for receiving said plug, said passageway communicating with said cavity;
   a cage positioned in said cavity and slidably movable therein, said cage having a plurality of radial passageways at the upper end thereof;
   first resilient means positioned in said cavity and bearing against said cage whereby said cage is biased upwardly;
   a spool positioned in said cage and slidably movable therein, said spool including an expanded portion having a camming surface thereon;

second resilient means positioned in said cage and bearing against said spool whereby said spool is biased upwardly; and a plurality of balls, one of said balls positioned in each of said radial passageways of said cage, said balls being adapted to be wedged between said tapered surfaces to lock said plug in said housing.

2. A fastener comprising:

a plug having a tapered lower portion;

a housing having an annular wall and top and bottom portions defining a central cavity, the inner surface of said wall having a tapered portion intermediate the ends thereof, said tapered portion being tapered in the same direction as the tapered portion of said plug but at a greater angle, said top portion having a passageway therethrough for receiving said plug, said passageway communicating with said central cavity;

a cage positioned in said cavity and slidably movable therein, said cage having a plurality of radial passageways at the upper end thereof;

first resilient means positioned in said cavity and bearing against said cage whereby said cage is biased toward said top portion;

a spool positioned in said cage and slidably movable therein, said spool including a body portion and an expanded portion having a camming surface thereon;

second resilient means positioned in said cage and bearing against said spool whereby said spool is biased towards said top portion;

a ball positioned in each of said radial passageways of said cage, said balls having a diameter greater than the axial length of said radial passageways;

said first resilient means normally causing said balls to engage the inner surface of said wall above said tapered portion and extend through said radial passageways into engagement with said body portion of said spool whereby relative movement between said spool and said cage is prevented.

3. A fastener comprising:

a plug having a tapered lower portion and an axial passageway therethrough;

a housing having an annular wall and top and bottom portions defining a central cavity, the inner surface of said wall having a lower annular portion, a reduced upper annular portion, and a tapered portion intermediate said lower and upper portions, said top portion having a passageway therethrough for receiving said plug, said passageway communicating with said central cavity;

a cage positioned in said cavity and slidably movable therein, said cage having a plurality of radial passageways at the upper end thereof;

a first spring positioned in said cavity and bearing against said cage whereby said cage is biased toward said top portion;

a spool positioned in said cage and slidably movable therein, said spool including a body portion and an expanded portion having a camming surface thereon;

a second spring positioned in said cage and bearing against said spool whereby said spool is biased towards said top portion;

a ball positioned in each of said radial passageways of said cage, said balls having a diameter greater than the axial length of said radial passageways;

said first spring normally causing said balls to engage the upper portion of the inner surface of said wall and extend through said radial passageways into engagement with the body portion of said spool whereby relative movement between said spool and said cage is prevented;

said plug when inserted into said housing engaging said spool and exerting a downward force thereon, said force being transmitted to said cage by said balls whereby said cage is moved downwardly against the bias of said first spring until said radial passageways are opposite to said lower annular portion of said inner wall surface whereupon said camming surface of said spool forces said balls outwardly in said passageways until said spool can move relative to said cage, thereby allowing said cage and said balls to move upwardly under the force of said first spring.

4. A fastener comprising:

a plug having a tapered lower portion and an axial passageway therethrough;

a housing having a annular wall and top and bottom portions defining a central cavity, the inner surface of said wall having a lower annular portion, a reduced upper annular portion, and a tapered portion intermediate said lower and upper portions, said top portion having a passageway therethrough for receiving said plugs, said passageway communicating with said central cavity;

a cage positioned in said cavity and slidably movable therein, said cage having a plurality of radial passageways at the upper end thereof;

a first spring positioned in said cavity and bearing against said cage whereby said cage is biased toward said top portion;

a spool positioned in said cage and slidably movable therein, said spool including a body portion and an expanded portion having a camming surface thereon, and an axial passageway therethrough;

a plunger having one end fastened to said cage and passing through said axial passageway in said spool, said plunger having a head at the other end thereof to prevent passage of said spool beyond said head;

a second spring positioned in said cage and bearing against said spool whereby said spool is biased towards said head;

a ball positioned in each of said radial passageways of said cage, said balls having a diameter greater than the axial length of said radial passageways;

said first spring normally causing said balls to engage the upper portion of the inner surface of said wall and extend through said radial passageways into engagement with the body portion of said spool whereby relative movement between said spool and said cage is prevented;

said plug when inserted into said housing engaging said spool and exerting a downward force thereon, said force being transmitted to said cage by said balls whereby said cage is moved downwardly against the bias of said first spring until said radial passageways are opposite to said lower annular portion of said inner wall surface whereupon said camming surface of said spool forces said balls outwardly in said passageways until said spool can move relative to said cage, thereby allowing said cage and said balls to move upwardly under the force of said first spring.

5. A fastener comprising:

a plug having a tapered lower portion and an axial passageway therethrough;

a housing having an annular wall and top and bottom portions defining a central cavity, the inner surface of said wall having a lower annular portion, a reduced upper annular portion, and a tapered portion intermediate said lower and upper portions, said top portion having a passageway therethrough for receiving said plug, said passageway communicating with said central cavity, the angle of taper of said tapered portion being greater than the angle of taper of said tapered portion of said plug;

a cage positioned in said cavity and slidably movable therein, said cage having a plurality of radial passageways at the upper end thereof;

a first spring positioned in said cavity and bearing against said cage whereby said cage is biased toward said top portion;

a spool positioned in said cage and slidably movable therein, said spool including a body portion and an expanded portion having a camming surface thereon, and an axial passageway therethrough;

a plunger having one end fastened to said cage and passing through said axial passageway in said spool, said plunger having a head at the other end thereof to prevent passage of said spool beyond said head;

a second spring positioned in said cage and bearing against said spool whereby said spool is biased towards said head;

a ball positioned in each of said radial passageways of said cage, said balls having a diameter greater than the axial length of said radial passageways;

said first spring normally causing said balls to engage the upper portion of the inner surface of said wall and extend through said radial passageways into engagement with the body portion of said spool whereby relative movement between said spool and said cage is prevented;

said plug when inserted into said housing engaging said spool and exerting a downward force thereon, said force being transmitted to said cage by said balls whereby said cage is moved downwardly against the bias of said first spring until said radial passageways are opposite to said lower annular portion of said inner wall surface whereupon said camming surface of said spool forces said balls outwardly in said passageways until said spool can move relative to said cage, thereby allowing said cage and said balls to move upwardly under the force of said first spring.

6. A fastener comprising:

a plug having a tapered lower portion and an axial passageway therethrough;

a housing having an annular wall and top and bottom portions defining a central cavity, the inner surface of said wall having a lower annular portion, a reduced upper annular portion, and a tapered portion intermediate said lower and upper portions, said top portion having a passageway therethrough for receiving said plug, said passageway communicating with said central cavity, the angle of taper of said tapered portion being greater than the angle of taper of said tapered portion of said plug;

a cage positioned in said cavity and slidably movable therein, said cage having a plurality of radial passageways at the upper end thereof;

a first spring positioned in said cavity and bearing against said cage whereby said cage is biased toward said top portion;

a spool positioned in said cage and slidably movable therein, said spool including a body portion and an expanded portion having a camming surface thereon, and an axial passageway therethrough;

a plunger having one end fastened to said cage and passing through said axial passageway of said spool, said plunger having a head at the other end thereof to prevent passage of said spool beyond said head;

a second spring positioned in said cage and bearing against said spool whereby said spool is biased towards said head;

a ball positioned in each of said radial passageways of said cage, said balls having a diameter greater than the axial length of said radial passageways;

said first spring normally causing said balls to engage the upper portion of the inner surface of said wall and extend through said radial passageways into engagement with the body portion of said spool whereby relative movement between said spool and said cage is prevented;

said plug when inserted into said housing engaging said spool and exerting a downward force thereon, said force being transmitted to said cage by said balls whereby said cage is moved downwardly against the bias of said first spring until said radial passageways are opposite to said lower annular portion of said inner wall surface whereupon said camming surface of said spool forces said balls outwardly in said passageways until said spool can move relative to said cage, thereby allowing said cage and said balls to move upwardly under the force of said first spring, said balls wedging between said tapered portions to prevent subsequent upward movement of said tapered portion of said plug;

application of a downward force on said plunger causing consequent downward movement of said cage whereby said balls are removed from the wedging position and said spool and plug can move upwardly under the force of said second spring.

7. A fastener comprising:

a plug having a tapered lower portion and an axial passageway therethrough;

a housing having an annular wall and top and bottom portions defining a central cavity, the inner surface of said wall having a lower annular portion, a reduced upper annular portion, and a tapered portion intermediate said lower and upper portions, said top portion having a passageway therethrough for receiving said plug, said passageway communicating with said central cavity, the angle of taper of said tapered portion being greater than the angle of taper of said tapered portion of said plug;

a cage positioned in said cavity and slidably movable therein, said cage having a plurality of radial passageways at the upper end thereof;

a first spring positioned in said cavity and bearing against said cage whereby said cage is biased toward said top portion;

a spool positioned in said cage and slidably movable therein, said spool including a lower annular body portion and an expanded upper portion having a camming surface on the bottom thereof, and an axial passageway through said body portion and said expanded portion;

a plunger having one end fastened to said cage and passing through said axial passageway of said spool, said plunger having a head at the other end thereof to prevent passage of said spool beyond said head, said head having a diameter less than the diameter of the axial passageway in said plug;

a second spring positioned in said cage and bearing against said spool whereby said spool is biased towards said head;

a ball positioned in each said radial passageways of said cage, said balls having a diameter greater than the axial length of said radial passageways;

said first spring normally causing said balls to engage the upper portion of the inner surface of said wall and extend through said radial passageways into engagement with the body portion of said spool whereby relative movement between said spool and said cage is prevented;

said plug when inserted into said housing engaging said expanded portion of said spool and exerting a downward force thereon, said force being transmitted to said cage by said balls whereby said cage is moved downwardly against the bias of said first spring until said radial passageways are opposite to said lower annular portion of said inner wall surface whereupon said camming surface on said expanded portion of said spool forces said balls outwardly in said passageways until said spool can move relative to said cage, thereby allowing said cage and said balls to move upwardly under the force of said first spring, said balls wedging between said tapered portions to prevent subsequent upward movement of said tapered portion of said plug;

application of a downward movement on said head of said plunger causing consequent downward movement of said cage whereby said balls are removed from the wedging position and said spool and plug can move upwardly under the force of said second spring until said spool engages said head of said plunger.

8. The fastener of claim 7 wherein the angle of taper of said tapered portion of said wall is approximately 18° and the angle of taper of said tapered portion of said plug is approximately 9°.

References Cited by the Examiner

UNITED STATES PATENTS 2,123,935  7/38  Dole.

FOREIGN PATENTS 897,080  5/44  France.
797,623  2/63  France.

EDWARD C. ALLEN, *Primary Examiner*.